Figure 1:
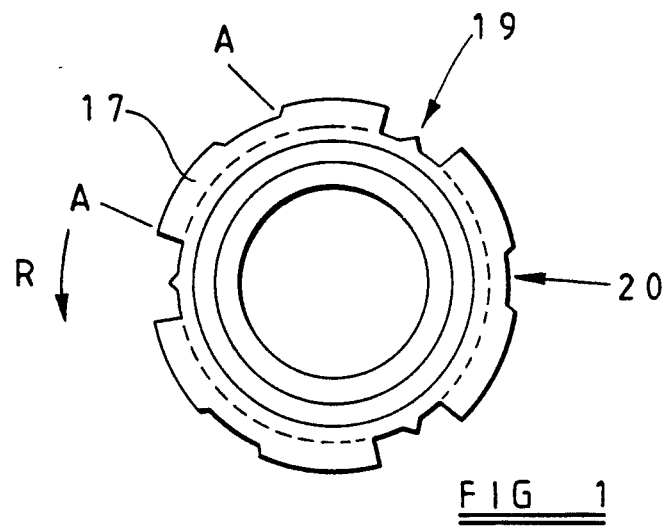

United States Patent [19]

Barnsdale

[11] Patent Number: 5,064,323
[45] Date of Patent: Nov. 12, 1991

[54] SELF-THREADING FASTENER

[75] Inventor: Timothy J. R. Barnsdale, Alcester, United Kingdom

[73] Assignee: Tappex Thread Inserts Limited, Warwickshire, England

[21] Appl. No.: 658,238

[22] Filed: Feb. 20, 1991

[51] Int. Cl.⁵ .............................................. F16B 37/12
[52] U.S. Cl. .................................... 411/178; 411/386; 411/418
[58] Field of Search ............... 411/178, 180, 181, 386, 411/387, 418, 419, 417

[56] References Cited

U.S. PATENT DOCUMENTS 3,405,596 10/1968 Neuschotz .......................... 411/418
4,818,165 4/1989 Shirai .................................. 411/178

FOREIGN PATENT DOCUMENTS 1591800 6/1981 United Kingdom .

Primary Examiner—Neill R. Wilson
Attorney, Agent, or Firm—Nixon & Vanderhye

[57] ABSTRACT

A threaded fastener or insert has a generally cylindrical body and about the body is formed a thread. Two sets of flutes are formed in the thread extending axially of the body. One of these sets extends deeper into the thread than the other set.

8 Claims, 1 Drawing Sheet

SELF-THREADING FASTENER

This invention relates to fasteners and in particular to threaded fasteners or inserts arranged in use to be self-threading into workpieces.

Threaded inserts have been widely used to locate into plastics materials to receive various complementary fastening elements. For example there is described in British patents 1545626 and 1591800 threaded inserts which are rendered thread cutting by providing flutes which extend in the longitudinal direction and provide at the intersection of the flutes with the threads cutting edges whereby the threads are cut in the body of plastics material.

In practice such inserts are capable of providing adequate pull out resistance but the tolerances on the hole for receiving the insert and on the dimensions of the insert itself must be very tightly controlled and maintained if there is to be certainty of high fastening efficiency. Moreover the thread cutting performance of the insert is important if the element is to be easily inserted.

An object of the invention is to provide a fastener which has improved insertion and pull out characteristics within the tolerances which it is normally possible to achieve.

According to the invention a fastener comprises a generally cylindrical body about which is formed a thread and two sets of flutes formed in the thread and extending longitudinally of the axis of the fastener body, one set of flutes extending deeper into the threads in the radial direction than the other set of flutes. Preferably the flutes of one set alternate with the flutes of the other set about the fastener body.

There may be three of the deeper flutes and three flutes in said other set equiangularly spaced about the body. Alternatively said other set may include only one or two flutes.

Said one set of flutes will conveniently extend radially to the depth of the thread.

In said other set the flute or flutes will conveniently extend less than half of the depth of the threads.

The circumferential extent of the flutes will normally provide for the thread length between the flutes to be somewhat greater than that of the flutes themselves.

Figure 2:
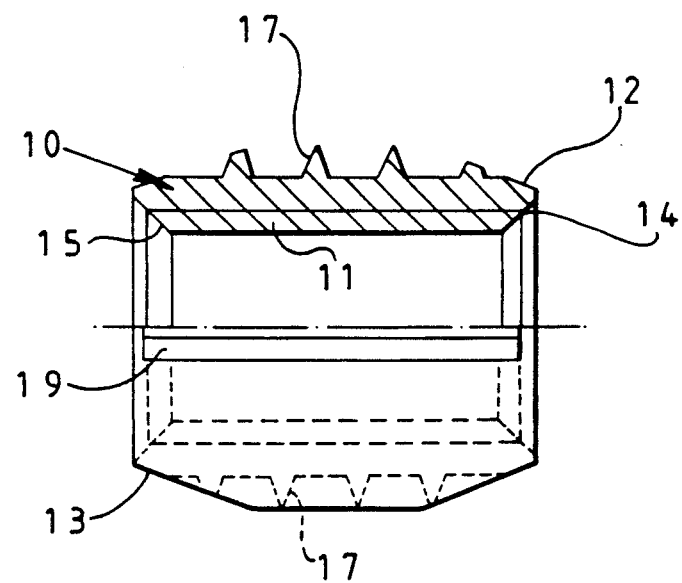

Further features of the invention will appear from the following description of an embodiment of the invention given by way of example only and with reference to the drawings, in which:

FIG. 1 is an end view of a fastener, and
FIG. 2 is a side elevation, partly in longitudinal section, of the fastener of FIG. 1.

Referring to the drawings a fastener is shown which is in the form of an insert generally comprising a cylindrical body 10 formed with an internal thread 11.

The body 10 is conveniently made from brass or steel and is intended for use in locating in a preformed hole in plastics material, for example thermoset plastics material, of a diameter less than the external diameter of the fastener, as will be explained. The internal female thread 11 is for receiving suitable complementary fastening elements (not shown) in conventional manner. Alternatively the fastener may have a male connection with an external thread on an extension of the insert body (not shown).

Externally of the fastener the body 10 is profiled at its ends to provide tapering surfaces at 12 and 13 to reduce the external diameter in these regions and to make the fastener double-ended. Internally the body 10 is tapered at its ends in the opposite direction to the taper at 12 and 13 to provide an enlarged internal diameter at 14 and 15 to more readily locate a cooperating element within the body.

Externally the body 10 is formed with a thread 17 and the thread carries the taper of the surfaces 12 and 13 over its end portions.

The thread 17 is formed with two sets of flutes 19 and 20 each set of flutes including three flutes equiangularly spaced about the body and the flutes of set 19 alternating with the flutes of set 20. Moreover the flutes of set 19 are spaced circumferentially equally from the flutes of set 20.

The flutes of set 19 are formed to have a radial depth substantially equal to the depth of the thread 17 whereas the flutes of set 20 have a radial depth of less than half of the depth of the thread 17, as shown. For example the flutes 19 may have a depth of 0.33 mm and the flutes 20 a depth of 0.1 mm in a body of maximum diameter of 4.65 mm.

At the leading edge A of each portion of the thread 17, having regard to the direction of rotation B of the insert during insertion, a cutting edge is formed for enabling the thread to be cut into the material of the hole in which the insert is to be placed. Thus cutting edges A are present adjacent each of the flutes of set 19 and 20, the edge A being deeper in the case of flutes 19 compared with flutes 20. At the same time the threads 17 penetrate to the sides of the receiving hole a distance depending on the relative sizes of the hole and the outside thread diameter. The hole diameter may be slightly more than the root diameter of the thread 17 in which case not only are the thread portions between the flutes 19 and 20 engaging the hole material but the thread portions beneath the flutes 20 also serve to provide pull out resistance by engaging the sides of the hole.

The provision of a total of six flutes provides increased thread cutting effectiveness whilst not significantly diminishing the pull out resistance. The size of the hole into which the insert is located can, with relatively soft hole materials, be reduced without excessive insertion torque on the insert. With relatively hard materials the size of the hole can also be reduced in order that the edges A of the fastener threads are able to cut into the material more easily. The fastener construction also provides for less wear on the thread towards the trailing edge of each thread length.

A further factor is in the production of swarf by the cutting action on the hole material. By the provision of flutes 20 in addition to flutes 19 the volume of swarf to be accommodated in the flutes 19 is reduced thereby reducing potential swarf compaction problems.

The ratios of flute depth and flute width are dependent on overall diameter and thread depth but are preferably as shown in the drawings. The circumferential length of the flutes 20 is less than that of flutes 19 which is in turn less than the length of the intervening thread portions.

Other arrangements to that shown in the drawings are also possible. In the arrangement illustrated, providing three flutes 20, the ends of the flutes 20 intersect the tapered end or ends 12 and 13 of the thread form to provide a leading cutting edge A in this region. In an alternative arrangement only one or two flutes 20 are provided. In the latter case the flute or flutes 20 are preferably arranged in the circumferential direction at a position so that the end of the flute or flutes intersects the tapering end 12 and/or 13 of the thread form. It may also be arranged that there are fewer than three of the flutes 19.

The female fastener may be single ended for entry into a hole from one end only in which case only one end of the fastener is profiled as at 12 and 13. Male fasteners are provided with the profile at the end which enters the hole and the orientation of the flutes 19 and 20 is arranged to ensure cutting edges A over the profiled portion.

What I claim as my invention and desire to secure by Letters Patent of the United States is:

1. A self-threading fastener which comprises a generally cylindrical body about which is formed a thread and flutes formed in the thread and extending longitudinally of the axis of the fastener body, the flutes intersecting the threads to define cutting edges at the intersections and located at the sides of the flutes and the leading edges of the threads, said cutting edges acting to cut threads during use of the fastener, the radially outer edge of the thread between said flutes having substantially constant radius, wherein the improvement comprises providing two sets of flutes, one set of flutes extending deeper into the threads in the radial direction than the other set of flutes and both sets of flutes defining cutting edges at their intersections with the thread.

2. A fastener according to claim 1 wherein the flutes of one set alternate with the flutes of the other set about the fastener body.

3. A fastener according to claim 1 comprising three of the deeper flutes and three flutes in said other set equiangularly spaced about the body.

4. A fastener according to claim 1 wherein said other set includes one or two flutes.

5. A fastener according to claim 1 wherein the flutes of said one set of flutes extend radially to the depth of the thread.

6. A fastener according to claim 1 wherein the flutes in said other set extend less than half of the depth of the thread.

7. A fastener according to claim 1 wherein the lengths of thread between the flutes is greater than the lengths of the flutes in the circumferential direction.

8. A self-threading fastener which comprises a generally cylindrical body about which is formed a thread and flutes formed in the thread and extending longitudinally of the axis of the fastener body, the flutes intersecting the threads to define cutting edges at the intersections, said edges acting to cut threads during use of the fastener, the flutes being arranged in two sets, one set of flutes extending deeper into the threads in the radial direction than the other set of flutes and both sets of flutes defining cutting edges at their intersections with the thread, and the length of thread between the flutes being greater than the lengths of the flutes in the circumferential direction.

* * * * *

UNITED STATES PATENT AND TRADEMARK OFFICE
CERTIFICATE OF CORRECTION

PATENT NO. : 5,064,323

DATED : November 12, 1991

INVENTOR(S) : Timothy J. R. BARNSDALE

It is certified that error appears in the above-identified patent and that said Letters Patent is hereby corrected as shown below:

On the Title Page after item [22] insert item

-- [30] Foreign Application Priority Data
    Feb. 28, 1990  Great Britain...........9004520.4--

Signed and Sealed this

Twenty-second Day of December, 1992

Attest:

DOUGLAS B. COMER

Attesting Officer

Acting Commissioner of Patents and Trademarks